United States Patent [19]

Jacob

[11] Patent Number: 5,410,902
[45] Date of Patent: May 2, 1995

[54] METHOD OF PRODUCING A CAGE FOR A CONSTANT VELOCITY UNIVERSAL JOINT

[75] Inventor: Werner Jacob, Frankfurt am Main, Germany

[73] Assignee: Lohr & Bromkamp GmbH, Offenbach am Main, Germany

[21] Appl. No.: 42,259

[22] Filed: Apr. 2, 1993

[51] Int. Cl.$^6$ ............................................. B21D 53/12
[52] U.S. Cl. ...................................... 72/334; 72/348; 29/898.067; 464/145
[58] Field of Search .................. 72/334, 335, 340, 341, 72/348; 29/898.067; 464/145, 146, 906

[56] References Cited

U.S. PATENT DOCUMENTS

| | | | |
|---|---|---|---|
| 1,040,274 | 10/1912 | Chambers . | |
| 1,477,164 | 12/1923 | Close . | |
| 1,712,076 | 5/1929 | Hughes | 29/898.067 |
| 3,935,717 | 2/1976 | Welschof | 464/906 |
| 4,500,144 | 2/1985 | de Campos | 29/898.067 |
| 4,777,813 | 10/1988 | Hoffmann | 72/348 |
| 4,846,764 | 7/1989 | Hazebrook et al. | 464/145 |
| 4,942,652 | 9/1987 | Hazebrook et al. | 29/898.067 |
| 4,968,287 | 11/1990 | Jacob | 464/145 |

FOREIGN PATENT DOCUMENTS

| | | |
|---|---|---|
| 0128870 | 6/1984 | European Pat. Off. . |
| 2280454 | 2/1976 | France . |
| 2556249 | 6/1985 | France . |
| 2108840 | 8/1942 | Germany . |
| 131350 | 11/1978 | Japan ................................. 464/146 |

*Primary Examiner*—Daniel C. Crane
*Attorney, Agent, or Firm*—Harness, Dickey & Pierce

[57] ABSTRACT

The invention relates to a method of producing a cage for constant velocity universal joints. The method involves a chipless forming operation. The method improves radial guidance of the balls by using larger window faces which are also produced in a chipless way. In a first step, starting from a circular plate metal blank, a dish with a rim is deep-drawn. At the same time, projections are formed which are circumferentially distributed along the inner and/or outer circumference of the dish in accordance with to be produced windows. The projections are directed inwardly and outwardly, respectively, away from the longitudinal axis. Also, starting from the dish opening, the projections extend over a distance which is greater than the width of the to be formed windows. In a second step, the base of the dish and the rim, either simultaneously or successively, are punched out while leaving parts to form the projections at the outer circumference. In a third step, either simultaneously or successively, the outwardly directed projections and the guiding face are transferred into their finished condition by profile stamping, and in a further step, the windows are punched out.

5 Claims, 2 Drawing Sheets

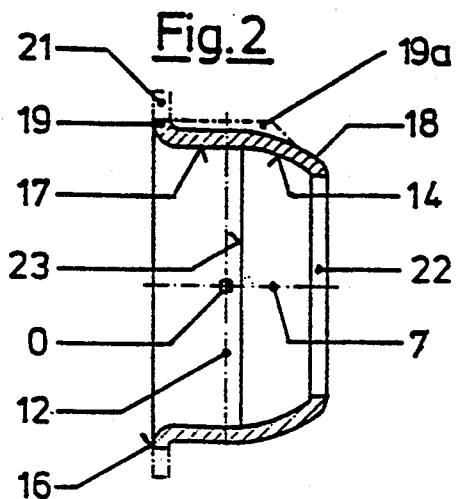
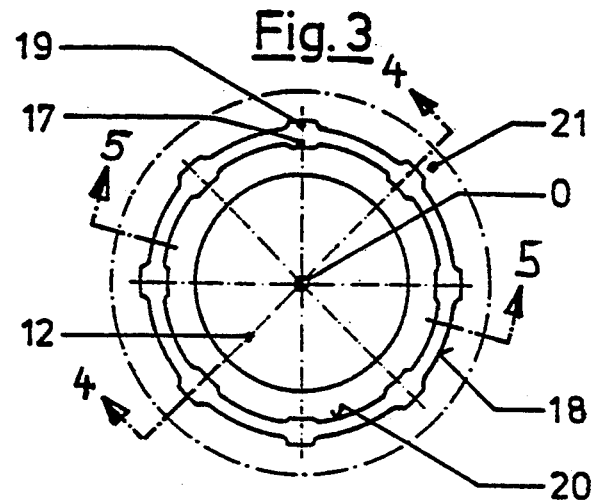
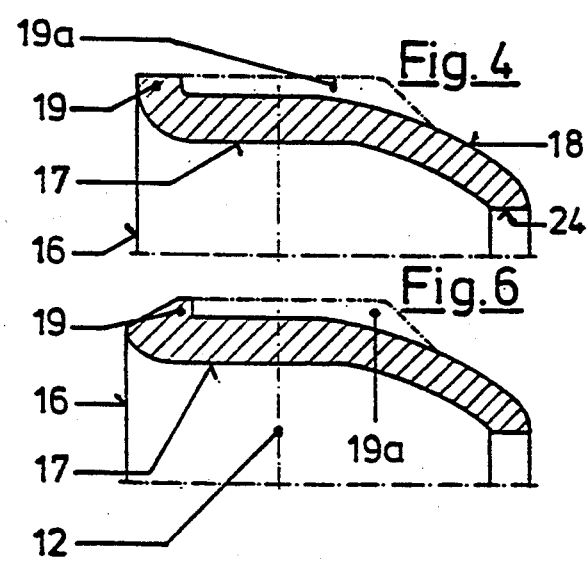
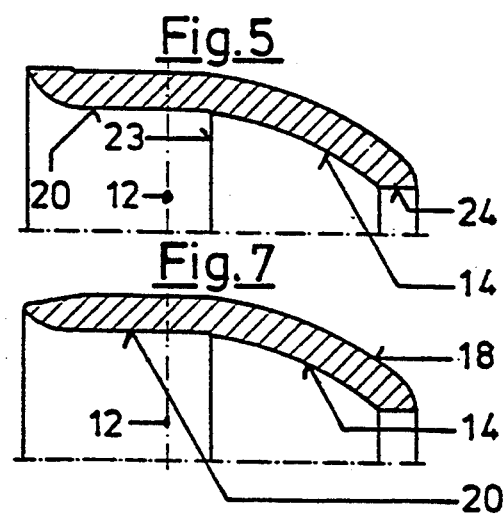
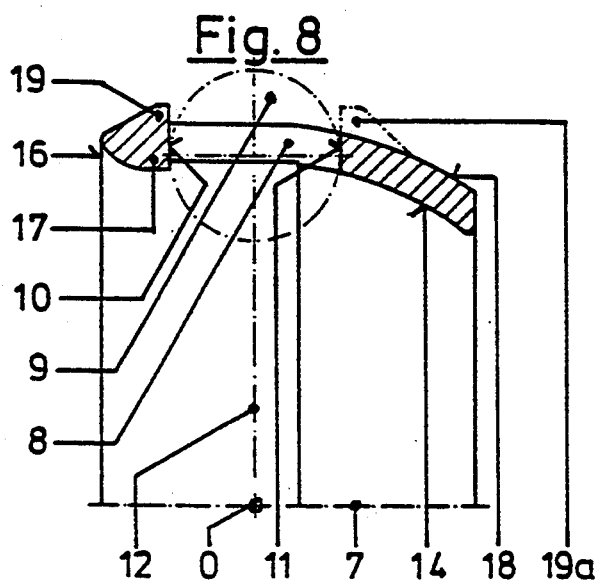
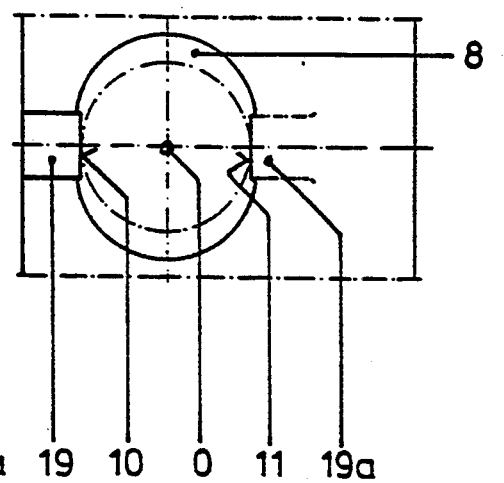

METHOD OF PRODUCING A CAGE FOR A CONSTANT VELOCITY UNIVERSAL JOINT

BACKGROUND OF THE INVENTION

The invention relates to a method of producing a cage for a constant velocity universal joint. The cage is intended to guide torque transmitting balls between an outer joint part and an inner joint part. The cage includes circumferentially distributed windows positioned in one plane and window faces which are spaced along the longitudinal axis. The window faces are intended to radially, circumferentially and movably guide the inwardly and outwardly projecting balls. The plane containing the centers of the windows intersects the longitudinal axis at a right angle in the articulation center. Also, the cage includes a guiding face which enables guidance on a guiding face of one of the joint parts. The method provides first, for a blank to be formed and, after further steps, for the windows to be punched out.

A method of producing a cage for a constant velocity universal joint is known from EP 0 128 870 B1. In this publication, it is mentioned that after the blank has been formed, the outer and inner shape of the cage are subjected to a turning operation before the windows are punched out. The windows are punched out by precision punching so that subsequent machining does not take place. A disadvantage of this method is that a chip-forming machining operation still has to be carried out. Thus, the outer and inner faces may not be provided with any projections in order to allow for the turning operation.

Furthermore, German Patent Number DE 38 30 579 A1, describes a method of producing a two piece cage. The halves are produced by a chipless forming process from plate metal in a circular shape with radially extending projections. The halves are placed into a part-spherical mold and connected to one another by welding. Subsequently, the guiding faces are subjected to a grinding operation.

U.S. Pat. No. 1,040,274 proposes a method of producing a cage for ball bearings starting from a plate metal strip. A dish with a rim is formed. The dish includes a smooth inner face and outer face. Subsequently, the base of the dish is punched out. After a rim remaining in the region of the base, after the punching operation has been smoothed, oval recesses, which are open towards one end face of the cylinder, are punched out to create kind of a crown. The cage windows acquire their final shape by bending over the points of the crown. The cage windows closely enclose the balls so that they are held firmly by the cage. No provision is made for faces to radially, circumferentially and movably guide the balls in the windows.

U.S. Pat. No. 1,477,164 discloses a method of producing a cage for a roller bearing. Here, starting from a piece of plate metal material, a dish with a rim is formed. Part of the base is punched out. During a further operational step, keyhole-like apertures are punched out of the outer circumference. The tabs facing one another are bent outwardly and receive a contour which is suitable for holding the rollers.

SUMMARY OF THE INVENTION

It is an object of the invention to provide a chipless method of producing a cage for a constant velocity universal joint. The cage window centers are arranged in a plane which intersects the longitudinal axis of the cage in the articulation center. The window faces are accurately arranged relative to the guiding face of the cage. Also, the windows project radially beyond the inner and outer contour of the cage.

In accordance with the invention, in a first step, starting from a circular plate metal blank, a dish with a rim is deep-drawn. At the same time, projections are formed which are circumferentially distributed along the inner and/or outer circumference of the dish in accordance with the windows to be produced. The projections are directed inwardly to or outwardly away from the longitudinal axis. Starting from the dish opening, the projections extend over a distance which is greater than the width of the windows. In a second step, the base of the dish and the rim, either simultaneously or successively, are punched out while leaving parts to form the projections at the outer circumference. In a third step, either simultaneously or successively, the outwardly directed projecting parts punched out of the rim are transferred into their finished condition by profile stamping. In a fourth step, the windows are punched out.

An advantage of this method is that it is possible to produce a chipless cage with radially inwardly and/or radially outwardly increased window faces. The window faces, with reference to the production condition of the cage, constitute undercuts. A further advantage is that the guiding faces do not require any subsequent chip-forming machining operations.

Cages which are provided with projections projecting in a nose-like manner to extend the window faces beyond the outer face radially outwardly and beyond the inner face radially inwardly, due to their irregular contour, require a great deal of expensive machining operations if produced by chip-forming methods. Thus, the cost of producing such a cage is very high. From a technical point of view, such a cage shape is advantageous since it improves ball guidance over a large range of articulation.

In a particularly advantageous way, the method in accordance with the invention is applied to joints like those described in German Patent DE 39 04 655 C1. With such joints, the cage, from one side, is designed to be undercut-free with reference to the extension of the guiding faces.

According to an embodiment of the invention, simultaneously with punching out the windows for the purpose of forming the window faces, material should be removed from the outwardly directed rim projections adjoining the dish opening. Thus, the entire radial extension of the window face is free from steps.

In cases requiring particularly close tolerances with regard to the position of the window centers relative to the center of the guiding face, in a fifth step via subsequent stamping, the windows are aligned to finish-dimensions towards the center of the guiding face. The punching process is preferably a precision punching process.

If necessary, the cage is remachined in a chip-forming way in the separating region of the base. However, during this remachining operation, none of the faces serving to guide the cage and the balls are machined.

A suitable material is a steel with a high core strength suitable for drawing.

From the following detailed description taken in conjunction with the accompanying drawings and subjoined claims, other objects and advantages of the present invention will become apparent to those skilled in the art.

BRIEF DESCRIPTION OF THE DRAWINGS

The invention is explained in greater detail with reference to an embodiment illustrated in the drawings wherein:

FIG. 2 is a longitudinal section view through a dish produced by deep-drawing from a circular blank.

FIG. 3 is a side elevation view of the dish, with the base and rim punched out.

FIG. 4 is an enlarged section view of FIG. 3 through line 4—4 thereof.

FIG. 5 is an enlarged section view of FIG. 3 through line 5—5 thereof.

FIG. 6 is an illustration according to FIG. 4, after the outwardly extending projections have been profile-stamped in the region of the dish rim.

FIG. 7 is a section view comparable to that shown in FIG. 5, after the dish rim has been profile-stamped.

FIG. 8 is a section view comparable to those shown in FIGS. 4 and 6, after the windows have been punched out.

FIG. 9 is a plan view of the cage in the region of a window, according to FIG. 8.

DETAILED DESCRIPTION OF THE PREFERRED EMBODIMENTS

Figure 1:
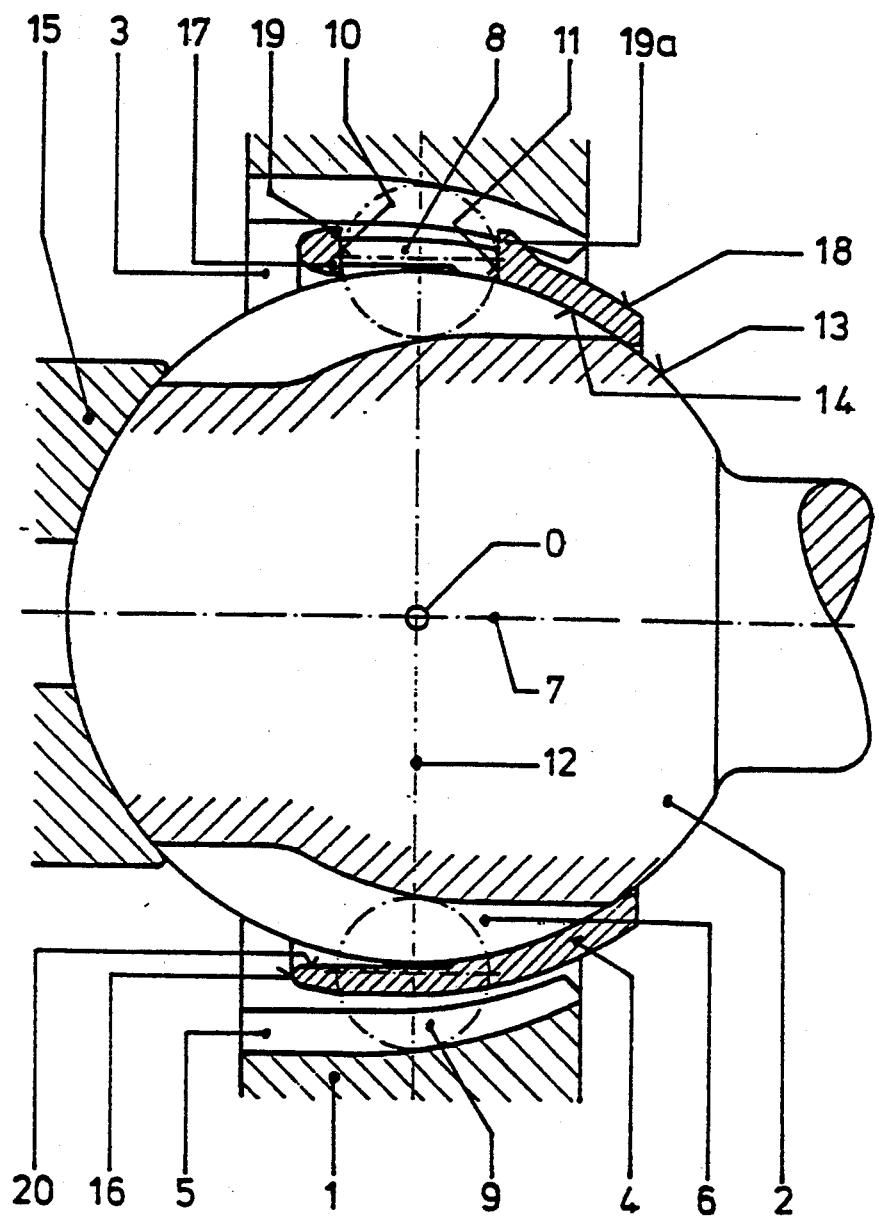
FIG. 1 is a longitudinal section view through a constant velocity universal joint with a cage produced in accordance with a method according to the present invention.

A constant velocity universal joint is shown diagrammatically in the form of a longitudinal section which includes an outer part 1, an inner part 2 received in the outer part cavity 3 and a cage 4 arranged between the inner part 2 and the outer part 1. The inner wall of the outer part 1 includes outer running grooves 5 in meridian planes with reference to the longitudinal axis 7. Opposite the grooves 5, are inner running grooves 6 in the outer face of the inner part 2.

The cage 4 includes circumferentially distributed windows 8 which correspond to the opposed outer running grooves 5 and inner running grooves 6. The windows 8 include window faces 10, 11 which are offset along the longitudinal axis 7. The windows 8 contain balls 9 which are arranged to emerge radially in the outer running grooves 5 and inner running grooves 6. The balls 9 are positioned between and guided by the window faces 10, 11. Also, the balls contribute to the transmission of torque.

The centers of the cage windows 8 are positioned on a plane 12 which intersects the longitudinal axis 7 in the articulation center 0 when the joint is in the extended position. The articulation center 0 at the same time constitutes the center of the spherical outer face 13 of the inner part 2 and the center of the guiding face 14 of the cage 4. The guiding face 14 is designed as a hollow-spherical partial face by which the cage 4 is guided on the outer face 13 of the inner part 2. The unit including the cage 4 and the inner part 2 is centered relative to the outer part 1 via the balls 9. To fix the inner part 2 in the axial direction, it is supported on a hollow-spherical face of a supporting element 15.

It can also be seen that the guiding face 14 has been exposed by extending the inner contour of the cage 4. The cage 4 is designed to be undercut-free from the open end 16 as far as the window faces 10 which adjoin the open end 16. The window faces 10 are formed as part of projections 19, projecting outwardly beyond the outer faces 18, and of the projections 17, projecting inwardly. The inner contour 20 which changes into the guiding face 14 extends in an undercut-free way from the open end 16.

The production of the cage 4 is explained in greater detail with reference to FIGS. 2 to 9.

First, the dish illustrated in FIG. 2 is produced by deep-drawing from a circular blank. In the course of being produced, the dish is formed with a rim 21 and an outer face 18. The outer face 18, starting from the open end 16 of the dish adjoins the rim 21 and initially extends along a first straight line with an inner contour 20 which changes into the guiding face 14 designed as a partial hollow sphere. In this region, the outer face 18 extends accordingly.

The guiding face 14 comprises a center centered in the articulation center 0 on the longitudinal axis 7. The plane 12 containing the window centers is also to extend through this center 0. This means that the windows 8 and the window faces 10, 11, limiting the windows 8, are aligned relative to this center 0. The approximately cylindrical shape of the inner contour 20 ends behind the plane 12 as viewed from the open end 16. The dish as illustrated in FIG. 2 includes base 22. As shown in FIG. 3, the dish includes the projections 17 projecting radially inwardly from the inner contour 20 towards the longitudinal axis 7. The projections 17 extend like a web from the open end 16 as far as and beyond the plane 12. The projections are arranged across the circumference and are limited in the circumferential direction. The size in the circumferential direction is determined by the movement of the balls of the joint in the circumferential direction when the joint is in the articulated condition.

The webs in FIG. 2 are identifiable only to the extent that the wall of the dish in the region of the webs 23 differs from that of the remaining region. Thus, the cross-section shown in the upper half of FIG. 2 is thickened relative to the wall in the lower half.

For deep-drawing purposes, the circular blank for forming the dish, in the region of the rim 21, is firmly clamped into a forming tool. According to an alternative design, the outer face 18, in addition to the window face 11, contains projections 19a which start from the rim 21, extend in the direction of the guiding face 14 and end behind a step-like transition 23 between the inner contour 20 and the guiding face 14.

After the dish has been deep-drawn in accordance with FIG. 2. the base 22 is punched out. Either simultaneously or subsequently, the rim 21 is also punched out in such a way that an outwardly extending projection 19 is produced in the region of the rim 21. In case a further projection 19a or a further extension of the window face 11 extending upwardly beyond the outer contour 18 is produced, this is followed by the complementary projection 19a constituting a web. The separating region 24 is obtained by punching out the base 22.

The intermediate region between two circumferentially adjoining pairs of projections 17, 19 has a reduced cross-section because of the line followed by the inner contour 20. The line followed in this intermediate region is identifiable in FIG. 5.

In a third step, either simultaneously or successively, the guiding face 14 is profile-stamped to its finished condition and the contour of the cage 4 is profile-stamped in the region of the open end 16, if only the window face 10 facing the open end 16, and not the region of the window face 10 is to be extended radially outwardly by a projection 19, the projection 19, is also profile-stamped to its final contour. The material is preferably displaced such that when the windows 8 are subsequently punched out to achieve the production condition as illustrated in FIGS. 8 and 9, the window faces 10 are treated simultaneously in the region of the projection 19. The window faces 10 and 11 achieve their finished condition by undergoing precision stamping. This leads to the formation of the projections 17 and 19 in the region of the open end 16. The amount of material which still existed between the two window faces 10 and 11 during the previous production stages in a web-like form has now been eliminated. In case a web-like projection 19a also existed in the region of the outer face 18 in addition to the projection 19 formed by the rim, the material is also removed which had initially accumulated on the outside. The projection 19a also remains on the side of the plane 12 facing away from the open end 16.

In order to accurately define the distance between the two window faces 10, 11, on the one hand, and the plane 12 containing the window centers relative to the articulation center 0 and thus the center of the guiding face 14, a subsequent stamping operation is carried out by applying pressure in the tool, starting from the open end 16. For this purpose, a tool having the final dimension of the window width is inserted into the windows 8, with the window width being adapted and the plane 12 being displaced in order to adjust them to the center 0 constituting the center of the guiding face 14. Finally, the separating region 24, the region separating the base 22 from the dish, may subsequently undergo a chip-forming turning operation for the purpose of achieving the contour shown in FIG. 8.

While the above detailed description describes the preferred embodiment of the present invention, the invention is susceptible to modification, variation, and alteration without deviating from the scope and fair meaning of the subjoined claims.

I claim:

1. A method of producing a cage for a constant velocity universal joint, comprising:
    providing a circular plate metal blank;
    deep-drawing said blank into a dish with a rim;
    forming circumferentially distributed projections along the inner and/or outer circumference of the dish to be formed in accordance with windows, said projections being directed inwardly to and/or outwardly away from the longitudinal axis of the dish and which, starting from the dish opening, said projections extending over a distance which is greater than the width of the to be formed windows, wherein the width of the to be formed windows is defined by a distance in which to be formed window walls are spaced relative to each other along the longitudinal axis of the dish between the rim and the base;
    punching out the base of the dish and the rim and wherein projections are formed along the outer circumference of the dish, leaving parts for forming said projections at the outer circumference;
    profile stamping said parts left in the rim to form their finished condition; and
    punching out the windows.

2. A method according to claim 1, further comprising removing material from the projections adjoining the dish opening to form window faces.

3. A method according to claim 1, further comprising stamping and aligning the windows to their finish-dimensions towards a center of the guiding face.

4. A method according to claim 1, wherein said punching step is a precision punching process.

5. A method according to claim 1, remachining said cage in a chip-forming way in the separating region of the base.

* * * * *

UNITED STATES PATENT AND TRADEMARK OFFICE
CERTIFICATE OF CORRECTION

PATENT NO.   :   5,410,902
DATED        :   May 2, 1995
INVENTOR(S)  :   Werner Jacob It is certified that error appears in the above-indentified patent and that said Letters Patent is hereby corrected as shown below:

On the cover page, Item [30]

Foreign Application Priority Data

April 8, 1992 [DE]   Germany . . . . . P 42 11 758.5

Signed and Sealed this

Twenty-sixth Day of September, 1995

Attest:

BRUCE LEHMAN

*Attesting Officer*   *Commissioner of Patents and Trademarks*